Dec. 10, 1963     S. G. YOUNT     3,113,435
COMPOSITE METAL REINFORCED SHEET MEANS
Filed March 29, 1960
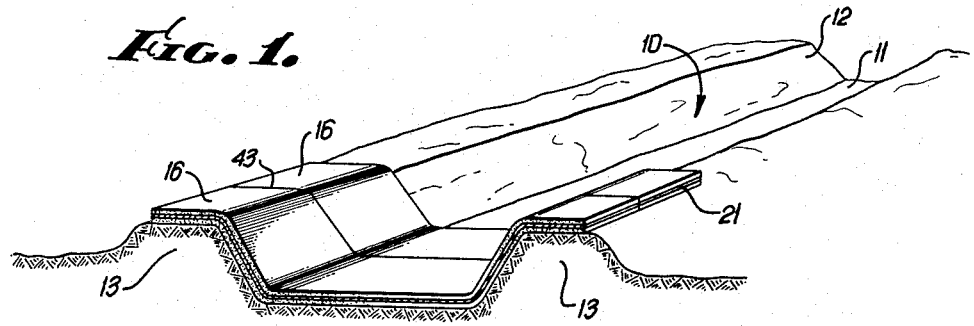
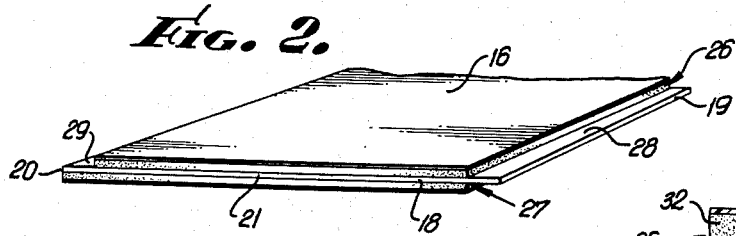
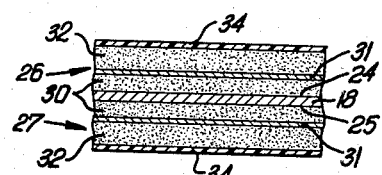
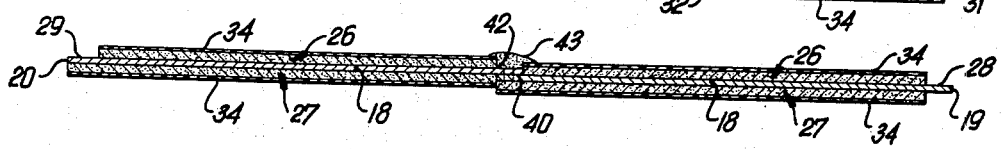
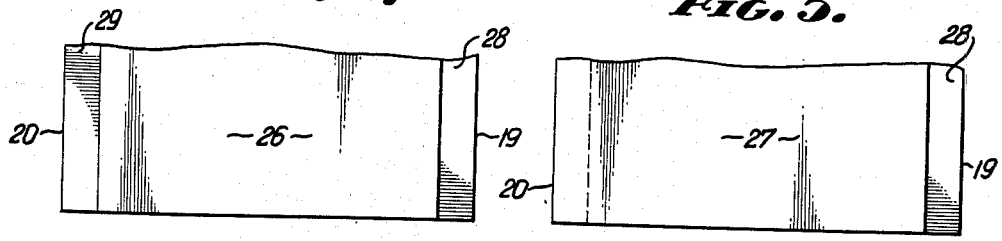
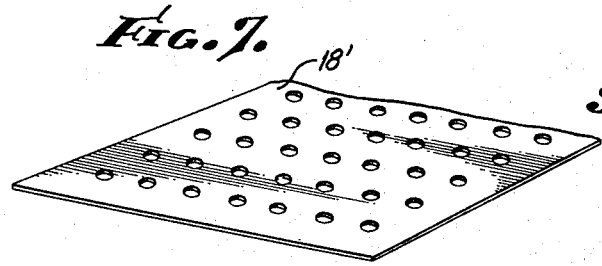
STANLEY G. YOUNT
INVENTOR.
BY *Miketta and Glenny*
ATTORNEYS.

United States Patent Office 3,113,435
Patented Dec. 10, 1963

3,113,435
COMPOSITE METAL REINFORCED SHEET
MEANS
Stanley G. Yount, 4489 Bandini Blvd.,
Los Angeles, Calif.
Filed Mar. 29, 1960, Ser. No. 18,434
4 Claims. (Cl. 61—7)

This invention relates generally to a composite reinforced sheet means, and more particularly to a pliant composite dimensionally stable construction sheet member useful in lining earth-formed irrigation canals, channels, reservoirs, drying beds and the like and adapted to be readily handled, stored and installed.

Arid regions in this country are being continually developed for agricultural purposes by conveying water to them from remote water sources. Aquaducts of concrete construction may conduct water for long distances to permanent reservoirs at water distribution centers. Local distribution of such water from such reservoirs to fields for irrigation thereof is often accomplished by conveying the water through irrigation ditches or canals formed of earth. In some instances, such earth-formed canals have been surface treated by applying a coating of bituminous composition material thereto, or by treating the surface thereof with finely divided clay particles to fill voids between the earth particles, or by other like means. Such prior proposed surface treatments have reduced loss of water conveyed by such canals as compared to a non-surface treated canal. However, irrigation canals so treated had several disadvantages including the impermanent character of the surface treatment, the constant maintenance to keep the canals free from weeds and other plant growth which would push through the composition coating, the breaking up of sections or portions of the treated canal surface due to sub-soil disturbances caused by non-uniform settling of soil around the canal and also by the action of a hot sun upon the treated surface when the canal was dry.

The present invention contemplates a composite construction sheet member which may be used to inexpensively yet permanently line or cover the earth surface of such irrigation canals and water reservoirs and which will obviate the disadvantages mentioned above. The composite construction sheet member of the present invention provides an impregnable barrier to plant growth, and a dimensionally stable sheet lining which will not crack or break into segments or fragments under adverse weather conditions, and which is sufficiently pliant and yieldable to accommodate itself to changes in configuration of the earth surface of the canal caused by sub-soil settling.

Generally speaking, such a construction sheet means for lining a canal or reservoir may include a plurality of pliant sheet-like liner members adapted to be arranged in parallel side-by-side relation and secured together along adjacent side edges to form a longitudinally and laterally stable lining adapted to generally conform to major surface irregularities. Each liner member includes a sheet of thin section metal material having top and bottom surfaces and parallel side edges. Permanent protective coverings including bituminous compositions or other like material are bonded to the top and bottom surface in such a manner that along one edge a metal strip is exposed on both faces and along the other edge the metal strip is exposed only at the top surface. The latter metal strip is adapted to underlie the metal strip of the corresponding one edge of an adjacent liner member to provide metal-to-metal contact along the length of the liner member for welding together as by continuous or spot welding. Over the joint line of welds at the metal-to-metal contact may be applied a band of asphalt or bituminous composition to protect said metal joints. Both top and bottom protective coverings are provided with an impermanent external coating of polymerizable plastic material such as polyethylene so that usual initial stickiness or tackiness of the bituminous surface of the permanent covering will be inhibited. The plastic coating permits the liner members to be stacked in sheet form or if desired, to be rolled into a roll form without sticking together. The impermanent plastic coating further facilitates handling of the liner members so that the liner members may be readily moved into selected placement and may be walked upon during installation. The invention contemplates that the impermanent coating of polyethylene will either eventually disintegrate or will disappear under climatic heat conditions in the bituminous composition and may further enhance the protective water-resistant characteristics of the liner members.

A main object of this invention therefore is to provide a novel composite reinforced construction member of sheet form for lining water containing means such as irrigation canals, ditches, water reservoirs, drying beds and the like.

An object of this invention is to disclose and provide a canal liner construction means having pliant yet dimensionally stable characteristics.

Another object of this invention is to disclose and provide a composite liner member including a laminate having a permanent protective covering means and an impermanent plastic coating applied thereto and adapted to facilitate handling, storage and installation of the liner means.

A further object of this invention is to disclose and provide a composite construction liner member adapted to be readily joined to a corresponding liner member as by welding.

A still further object of this invention is to provide a composite construction means utilizing thin sheet metal stock for contributing strength to said member and wherein said metal is protectively covered so as to prevent corrosion and deterioration of the metal while affording a waterproof permanent lining.

Many other objects and advantages of this invention will be readily apparent from the following description of the drawing in which an exemplary embodiment of the invention is shown.

In the drawings:

FIG. 1 is a top perspective view partly in section of an irrigation canal lined with composite construction liner members embodying this invention.

FIG. 2 is a top fragmentary perspective view of an end of a liner member shown in FIG. 1.

FIG. 3 is a sectional view taken in a vertical plane transverse to the liner members shown in FIG. 1.

FIG. 4 is a fragmentary top view of a liner member shown in FIG. 2.

FIG. 5 is a fragmentary bottom view of the liner shown in FIG. 2.

FIG. 6 is an enlarged fragmentary sectional view of the liner member of FIG. 2.

FIG. 7 is a fragmentary perspective view of a modification of a metal sheet for a liner member embodying this invention.

In FIG. 1, a cross section of an earth-formed irrigation canal or ditch is generally indicated at 10 and may comprise a canal bed 11 including inclined canal bank surfaces 12 generally formed by earth fill 13 which may be compacted in suitable manner. While a section of irrigation canal or ditch is shown it will be understood that the section may be of a reservoir or drying bed of any suitable shape and size for containing water for various purposes.

In this example, the irrigation ditch 10 may be lined with a composite flexible pliant construction sheet means including a plurality of liner members 16 arranged in parallel side-by-side relation and secured together along longitudinal side edges to form a continuous liner sheet means having longitudinal and lateral stability and yet generally conformable to surface configurations of the bed 11 and bank surfaces 12. The liner members 16 may be laid transversely to the direction of the irrigation ditch and in this illustration each liner member 16 is of sufficient length so as to continuously extend from the top of one fill 13 to the other fill 13 without interruption. It will be understood that the liner members 16 may be arranged in side-by-side relation in a longitudinal direction if so desired.

Each liner member may comprise an elongated imperforate sheet 18 of thin metal stock having an exemplary thickness of between .001 to .008 inch. Such thin sheet metal stock is generally pliant and may be readily bent or turned into a relatively small diameter roll form. Preferably, the sheet metal stock may be of steel although it is understood that other metals and metal alloys may be employed. Sheet 18 may have the planar, smooth, top and bottom surfaces 24 and 25 respectively; however, this invention contemplates that sheet 18 may be provided with embossed surface configurations in order to integrally strengthen the said sheet 18. Another example of sheet 18 is indicated in FIG. 7 wherein sheet 18' may be provided with a plurality of perforations or three openings to lighten the sheet while at the same time affording strength and dimensional stability to the liner members 16. The perforate sheet 18' may be formed as by an expanded metal process which is well known in the art.

The metal sheet 18 may be an elongated rectangle of uniform width and includes parallel longitudinal side edges 19 and 20. Opposite ends 21 of sheet 18 may be cut at right angles to longitudinal edges 19 and 20. It will be understood that plain ends 21 may be provided with other suitable configurations depending upon the method of construction of the earth-formed reservoir or water-containing means.

Permanent protective covering means 26 and 27 may be bonded or secured to top and bottom surfaces 24 and 25 of sheet 18. Along side edge 19 of sheet 18 the covering means 26 and 27 terminate in spaced relation to the edge 19 so as to provide an edge strip of metal 28 exposed on both top and bottom marginal edge faces. Along opposite edge 20 the top covering means 26 terminates in spaced relation thereto so as to provide a top marginal metal face 29 exposed throughout the length of said liner member. The bottom covering means 27 extends to edge 20 and covers the entire bottom surface 25 of sheet 18 except for the metal face at the edge metal strip 28.

The covering means 26 and 27, in this example, may each comprise a layer or lamina of asphalt 30 suitably applied to the surfaces 24 and 25 of the sheet 18 and bonded thereto. While the term "asphalt" is used herein, it will be understood that other suitable bituminous compositions and compounds resistant to soil and weather may be employed which form a tight bond to the sheet 18 and which protect the sheet 18 against corrosion, electrolysis, or chemical reactions with the soil.

On top of the asphaltic layer 30 may be applied a layer or a lamina of suitable sheet-like paper stock 31 such as a kraft paper. The paper sheet 31 may be embedded between asphaltic layer 30 and an outer layer 32 of asphaltic composition so as to provide a laminated sheet construction bonded to metal sheet 18 and having a pliancy which will readily accommodate itself to whatever configuration the sheet 18 is shaped. The covering means 26 and 27, which in this example include the laminated asphalt-paper-asphalt combination, protectively covers the metal sheet 18 throughout its length and width except for the metal edge strip 28 and the top metal face 29. While a laminated construction is described the invention contemplates that in some instances a composition of bituminous material may constitute the covering means.

An impermanent protective coating 34 of a suitable plastic material which is compatible with the asphaltic layers 32 may cover the entire exposed external surfaces of liner member 16 for the purpose of facilitating handling, storage and installation of said liner members. The protective coating 34 may include a suitable thermoplastic polymerizable resin or formulated plastic composition such as a polyethylene which forms a barrier or shield over the external surfaces of the asphaltic layers 32 on both coverings 26 and 27, inhibit or contain the usually initial tackiness and stickiness of the asphaltic surface. Since the polyethylene coating 34 is not tacky or sticky but is relatively smooth and slippery liner members 16 with the polyethylene coating 34 may be readily stacked one upon the other when used in sheet form without sticking to adjacent members 16 and may be readily separated. Liner members 16 may be rolled about an axis so as to form a roll of selected diameter and length without the turns of the roll sticking or becoming bonded together. The impermanent polyethylene coating 34 thus serves as a temporary protective coating for the asphaltic surface therebeneath permitting immediate handling of the liner members 16. When the liner members 16 are laid across an irrigation ditch the plastic coating on liner members may be walked upon without disturbing the asphaltic covering therebeneath and without footwear sticking to the member 16 or pulling portions of the asphaltic layer from the sheet 18.

When the liner members 16 are laid side-by-side in parallel ararngement they may be joined together as shown in FIG. 3 wherein the top surface 29 adjacent edge 20 of a liner member is disposed beneath the exposed metal strip 28 at the edge 19 of the adjacent liner member. Thus metal-to-metal contact is provided as at 40 between adjacent metal sheets 18 and metal sheets 18 may thereby be secured together along such joint as by welding. Such welding may include a continuous weld or may include a plurality of selectively spaced spot welds along the length of the liner members 16. When the liner members 16 are joined as described above the bottom covering 27 of one liner member abuts the bottom covering 27 of the adjacent liner member so as to form a virtually continuous permanent protective covering for the plurality of liner members 16. It should be noted that the heat of welding will serve to cause the asphaltic layers of the adjacent coverings 27 to flow together and merge into a virtually integral bottom covering.

After the welding of sheets 18 along the edges 19 and 20 as above described, the shallow longitudinal joint recess 42 formed between opposed edges of the adjacent top covering means 26 may be filled with a band or strip of suitable asphaltic composition 43 in order to seal the welds and to protect the metal strip 28. It will be readily understood that in addition to applying a band of asphaltic composition such as 43, an asphaltic laminated tape may be applied over the joint recess 42 in order to reinforce the longitudinal joints between top covering means 26 on the liner members 16.

It will thus be readily apparent that when a plurality of liner members 16 are joined together as described above, a composite reinforced construction sheet means is provided which will serve as an effective yet inexpensive means for lining an earth-formed reservoir. The presence of the metal sheets 18 secured together as by welding provides a dimensional stability to the entire construction sheet means which virtually eliminates any leakage through the sheet means caused by irregularities in the bed of the irrigation ditch and by generally normal subsoil settling in such ditches. It will be readily apparent that the metal sheet 18 not only is adapted to conform to major surface irregularities but that the integrity of the entire construction sheet means will be maintained while it is adapting itself to such irregularities.

Those skilled in the art will also note that the asphalt laminate construction provides a permanent protective covering for the metal sheet which is not only waterproof and resistant to cracking or breaking which might permit the beginning of a water leak or the intrusion of plant growth but is also chemically inert and is resistant to any galvanic action which might tend to corrode or deteriorate the metal sheet. Thus, a lining is provided which is permanent and leakproof.

It will also be readily understood that the protective coating of plastic material on the asphaltic covering means enables the liner members to be promptly and readily used in the field. The plastic protective coating 34 may be compounded to deteriorate under weathering and aging caused by complex interactions of sunlight, changing temperatures and humidities after a relatively short period of time such as six months and the plastic components may crack off or become absorbed by the asphaltic composition. A further sealing effect is thus produced between the top covering means 26 and band 43 when the liner members are further subjected to heat from the sun.

While in this example the protective covering means included a layer or lamina of paper, it will be readily understood that the laminate or covering means 26, 27 may not include paper and that the sheet metal 18 may be simply covered by a coating of asphaltic composition of selected thickness which may be coated with the plastic or polyethylene coating 34.

It will be readily understood that various modifications and changes may be made in the liner member described above which come within the spirit of this invention and all of such changes and modifications come within the scope of the appended claims and are embraced thereby.

I claim:

1. A composite construction, pliant sheet member for use in lining earth-formed irrigation channels, reservoirs and the like, and adapted to be rolled into roll form or stacked in discrete readily separable sheets, comprising: an elongated sheet of thin metal material having parallel longitudinal edges and top and bottom surfaces; a permanent covering means including a bituminous composition bonded to each surface and spaced from one edge to define a longitudinal metal edge strip having top and bottom exposed metal faces, said covering means for the top surface being spaced from said other edge to define a longitudinal metal strip face whereby said metal edge strip may overlie the metal strip face of an adjacent corresponding sheet member in metal-to-metal contact therewith for welding together; and a coating of plastic material for said permanent covering means presenting a non-sticky surface under conditions of relatively high ambient temperatures whereby the sheet member may be stacked, rolled, and readily handled during installation.

2. A composite sheet member as stated in claim 1 wherein the coating of plastic material comprises polyethylene.

3. A composite pliant sheet construction member for use in lining earth-formed irrigation channels, reservoirs and the like, comprising a sheet of thin metal material having side edges and top and bottom surfaces; a permanent laminate covering means including asphalt bonded to each surface, both covering means being spaced from one side edge to define one metal edge strip having top and bottom metal faces exposed, said covering means for the top surface being spaced from the other side edge to define a metal edge strip having a top face exposed, said latter top face being adapted to underlie a corresponding metal edge strip of an adjacent sheet member in metal-to-metal contact for welding; and a plastic coating for both of said covering means and presenting a non-sticky surface under exposure to high ambient temperatures.

4. A dimensionally stable pliant sheet construction means for use in lining earth-formed irrigation channels, reservoirs and the like comprising: a plurality of liner members arranged in parallel side-by-side relation and secured together along side edges thereof; said plurality of liner members having a virtually unbroken permanent protective covering including an asphalt composition normally tacky and slightly flowable under relatively high ambient temperature and including a top covering with parallel bands of asphalt composition joining said top coverings; a plurality of sheets of thin gauge sheet metal beneath said top coverings and welded together at overlapping metal to metal joints beneath said asphalt bands; and a polyethylene coating on the top covering and initially presenting a non-tacky surface under exposure to relatively high ambient temperatures whereby said sheet construction means is readily handled and installed.

References Cited in the file of this patent

UNITED STATES PATENTS

| 1,002,303 | Newsome | Sept. 5, 1911 |
| 2,017,106 | Sandell | Oct. 15, 1935 |
| 2,021,577 | Odell | Nov. 19, 1935 |
| 2,043,271 | Wahl et al. | June 9, 1936 |
| 2,263,536 | Dike | Nov. 18, 1941 |
| 2,596,179 | Seymour | May 13, 1952 |
| 2,771,745 | Bramble | Nov. 27, 1956 |
| 2,893,907 | Bove | July 7, 1959 |

FOREIGN PATENTS

| 452,277 | Italy | Oct. 17, 1949 |

OTHER REFERENCES

Civil Engineering, September 1958, pages 38–39.